United States Patent
Mounir Alaoui et al.

(10) Patent No.: US 10,212,560 B2
(45) Date of Patent: Feb. 19, 2019

(54) AUTOMATED CALL SET-UP BETWEEN TWO TERMINALS

(75) Inventors: Salim Mounir Alaoui, Issy les Moulineaux (FR); Pascal Pinchaud, La Norville (FR)

(73) Assignee: ORANGE, Paris (FR)

( * ) Notice: Subject to any disclaimer, the term of this patent is extended or adjusted under 35 U.S.C. 154(b) by 692 days.

(21) Appl. No.: 12/995,367

(22) PCT Filed: May 29, 2009

(86) PCT No.: PCT/FR2009/051012
§ 371 (c)(1),
(2), (4) Date: Nov. 30, 2010

(87) PCT Pub. No.: WO2009/156659
PCT Pub. Date: Dec. 30, 2009

(65) Prior Publication Data
US 2011/0096917 A1    Apr. 28, 2011

(30) Foreign Application Priority Data

May 30, 2008    (FR) .................................... 08 53581

(51) Int. Cl.
| | |
|---|---|
| *H04W 4/12* | (2009.01) |
| *H04L 12/58* | (2006.01) |
| *H04L 29/06* | (2006.01) |
| *H04W 76/10* | (2018.01) |

(52) U.S. Cl.
CPC ............... *H04W 4/12* (2013.01); *H04L 51/38* (2013.01); *H04L 65/1069* (2013.01); *H04W 76/10* (2018.02)

(58) Field of Classification Search
CPC ..... H04W 4/12; H04W 76/02; H04L 12/5895; H04L 51/38; H04L 65/1069
USPC ............. 379/88.13, 242; 370/352, 353, 466; 455/466
See application file for complete search history.

(56) References Cited

U.S. PATENT DOCUMENTS

| | | | |
|---|---|---|---|
| 8,346,231 B1* | 1/2013 | Smith ................. | H04L 12/1818 379/202.01 |
| 2004/0067761 A1* | 4/2004 | Pyhalammi et al. ......... | 455/466 |
| 2006/0167849 A1 | 7/2006 | Marcus et al. | |
| 2006/0250989 A1* | 11/2006 | Wengrovitz ...... | H04L 29/06027 370/260 |
| 2007/0255795 A1* | 11/2007 | Wang et al. .................. | 709/207 |

(Continued)

FOREIGN PATENT DOCUMENTS

| | | |
|---|---|---|
| EP | 1555786 A1 | 7/2005 |
| WO | 2008004153 A2 | 1/2008 |
| WO | 2008049647 A1 | 5/2008 |

OTHER PUBLICATIONS

International Search Report and Written Opinion dated Oct. 20, 2009 for corresponding International Application No. PCT/FR2009/051012, filed May 29, 2009.

(Continued)

*Primary Examiner* — Antim G Shah
(74) *Attorney, Agent, or Firm* — David D. Brush; Westman, Champlin & Koehler, P.A.

(57) ABSTRACT

A method and apparatus are provided for sending a first terminal a message including a command adapted to trigger automatic sending by the first terminal of a request to set up a call between the first terminal and a second terminal.

14 Claims, 3 Drawing Sheets

(56) References Cited

U.S. PATENT DOCUMENTS

| 2008/0010297 | A1* | 1/2008 | Goldfarb | H04M 7/003 |
| 2008/0081662 | A1* | 4/2008 | Strandell | H04M 1/274516 |
| | | | | 455/557 |
| 2008/0101278 | A1* | 5/2008 | Bengtsson et al. | 370/328 |
| 2008/0123685 | A1* | 5/2008 | Varma et al. | 370/466 |
| 2009/0161842 | A1* | 6/2009 | Sylvain | 379/93.05 |
| 2010/0142515 | A1* | 6/2010 | Jana et al. | 370/352 |

OTHER PUBLICATIONS

English Translation of the Written Opinion dated Oct. 20, 2009 for corresponding International Application No. PCT/FR2009/051012, filed May 29, 2009.

* cited by examiner

AUTOMATED CALL SET-UP BETWEEN TWO TERMINALS

CROSS-REFERENCE TO RELATED APPLICATIONS

This Application is a Section 371 National Stage Application of International Application No. PCT/FR2009/051012, filed May 29, 2009, and published as WO 2009/156659 on Dec. 30, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE The disclosure relates to the telecommunications field and more specifically to a solution for automated call set-up between two terminals.

Of interest here are techniques for automated call set-up in which a user of one of two terminals explicitly formulates a request for a call to be set up between the two terminals. Such a request is formulated by selecting a contact from a list of contacts associated with the user concerned, for example.

BACKGROUND OF THE DISCLOSURE

The documents U.S. Publ. No. 2004/0067761 and U.S. Publ. No. 2006/2167849 propose exchanging messages between terminals after connection to an IP network and thus after recovery of their respective IP addresses in order to be able to request data call set-up via the IP network.

The documents WO2008/049647 and EP 1 555 786 teach setting-up a call between two terminals in an IP environment when the called party is not connected to the IP network. To this end, a terminal connected to the IP network requiring to call a destination terminal that is not connected to the IP network sends the destination terminal a message including its IP address via a network other than the IP network. This message commands the destination terminal to set-up a data call via the IP network with the terminal connected to the IP network. Because the terminal initiating the call does not set up the call, it is not identified as the calling terminal for the call. The destination terminal must be able to connect to the IP network to set up said call with the terminal connected to the IP network, the aim being to reduce failures to set up data calls in an IP network.

If the list of contacts is provided by a web server, the server then assumes responsibility for instigating the operations necessary for connecting a user terminal that sent a request to a terminal associated with the selected contact.

A first known technique connects the two terminals by means of a link conforming to the Internet Protocol (IP). This solution sets up a first communications link between the server receiving the call request and one of the two terminals and then a second link between the server and the other terminal, these two links thereafter being joined to set-up a single link between the two terminals via the server.

That technique has the drawback of being greedy for server resources, notably bandwidth. It is also applicable to packet-switched networks but not suitable for circuit-switched networks. In particular, it is not applicable to setting up a call between two terminals via a GSM mobile network.

Finally, because the call is set up from a network server, that technical solution gives rise to a billing problem in that for a call set up in circuit mode, it is usually the terminal sending the call request that is billed. That technique is thus incompatible with the billing method used in circuit-switched networks.

A need has therefore emerged for automated call set-up between two terminals that is applicable to circuit-switched networks, notably GSM mobile networks, and compatible with the billing mode used in those networks.

SUMMARY

A control method of an embodiment of the invention includes a step of sending a first terminal a message including a command adapted to cause said first terminal to send a request to set up a call between the first terminal and a second terminal.

A first aspect of an embodiment of the invention provides a control method including a step of sending a command from a processing server (AS1) to a first terminal (MB1) in a command message, said command being adapted to trigger sending by said first terminal of a request to set up a call between the first terminal and a second terminal (MB2).

The solution proposed by an embodiment of the invention makes it possible to generate a call request, i.e. to send a call set-up request, directly from the first terminal. Because of this, the call request is detected by the network as coming directly from the first terminal and is billed as such. No modification of the billing servers is necessary. Finally, it is no longer necessary to have a network device for generating a call request.

Because the call set-up request is initiated by the terminal initiating the call request, it is furthermore possible to use a procedure of validation by the user of the terminal in order for the call set-up request to be sent only with the approval of the user.

In the method of one implementation of the invention the command message is sent to the first terminal by a message server assigned to routing messages in the network via which said call must be set up.

An embodiment of the invention exploits existing network infrastructures to route the message and to control the terminal.

In one particular implementation of the invention sending is effected following said processing server receiving a call set-up request formulated by a user of said first terminal. In particular, the message server sends the message at the command of the processing server following the processing server receiving a call set-up request.

The user is thus in a position to specify the terminal with which a call must be set up.

A control device according to an exemplary aspect of the disclosure includes means for sending a first terminal a message including a command adapted to be sent to the first terminal in order to trigger sending by said first terminal of a request to set up a call between said first terminal and a second terminal.

In a correlated way, an exemplary embodiment of the invention provides a control device (SM1, GW1, AS1) including means for sending a first terminal (MB1) a command from a processing server (AS1) adapted to be sent to the first terminal in a command message including said command in order to trigger sending by said first terminal of a request to set up a call between said first terminal and a second terminal (MB2).

A terminal of an exemplary embodiment of the invention includes means for receiving and processing a message including a command adapted to trigger sending by said terminal of a request to set-up a call with a second terminal.

A further embodiment of the invention provides a terminal (MB1) including means for receiving and processing a message, said message including a command from a processing server (AS1), said command being adapted to trigger automatic sending by said terminal of a request to set up a call with a second terminal (MB2).

The advantages stated for the method of an embodiment of the invention may be transposed directly to the device and the terminal of the invention.

In one embodiment of the invention, the device is part of a message routing server for a network via which said call must be set up, the sending means being in this situation activated at the command of an interconnection device between a first network and the second network.

According to a further embodiment of the invention, the device is part of a user request processing server, the sending means being activated in response to a call set-up request formulated by a user of said first terminal.

In a further embodiment of the invention, the device is part of an interconnection device between a first network and a second network via which said call must be set up, the sending means being intended in this situation to be activated at the command of a processing server (AS1) after reception by said processing server of a call set-up request formulated by a user of said first terminal.

A command signal of an embodiment of the invention carries a command adapted to be sent to a first terminal to trigger sending by said first terminal of a request to set up a call between the first terminal and a second terminal.

An embodiment of the invention further provides a method comprising sending a command signal carrying a command from a processing server (AS1) to a first terminal (MB1), and sending by said first terminal a request to set up a call between the first terminal and a second terminal (MB2), wherein the sending by the first terminal is triggered by the command signal.

The signal is for example an electrical or electromagnetic signal—a radio or optical signal—routed via appropriate wire or wireless transmission means.

The signal includes an identifier of the second terminal (its telephone number or IP address, for example) and optionally includes an identifier of the first terminal. The signal also carries a code identifying the command to enable the command to be processed appropriately.

In a preferred implementation of an embodiment of the invention, the various steps of the method are executed by software or a computer program, this software including software instructions adapted to be executed by a data processor of a device and being designed to command the execution of the various steps of that method.

Consequently, an embodiment of the invention further provides a program adapted to be executed by a computer or by a data processor and including instructions for commanding execution of the steps of a method as referred to above.

This program may use any programming language and take the form of source code, object code or a code intermediate between source code and object code, such as a partially-compiled form, or any other desirable form.

An embodiment of the invention further provides an information medium readable by a computer or data processor and including instructions of a program as referred to above.

The information medium may be any entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which can be routed via an electrical or optical cable, by radio or by other means. The program of an embodiment of the invention can in particular be downloaded over a network of the Internet type.

Alternatively, the information medium may be an integrated circuit in which the program is incorporated, the circuit being adapted to execute the estimation and signaling method in question or to be used in its execution.

Another embodiment of the invention uses software and hardware components. In view of this, in this document the term module may correspond either to a software component or to a hardware component. A software component corresponds to one or more computer programs, one or more subroutines of a program or, more generally, any element of a program designed to implement a function or a set of functions. A hardware component corresponds to any element of a hardware set designed to execute a function or a set of functions.

BRIEF DESCRIPTION OF THE DRAWINGS

Other objects, features, and advantages become apparent from the following description given by way of non-limiting example only and with reference to the appended drawings, in which.

DETAILED DESCRIPTION OF ILLUSTRATIVE EMBODIMENTS

An embodiment of the invention is described in the context of its application to GSM networks and in the situation of its use of command messages in the form of SMS (Short Message Service) messages.

Thus an embodiment of the invention is described in the context of voice call set-up. It is applicable to other types of network, however, subject to the use of an appropriate command format.

Figure 1:
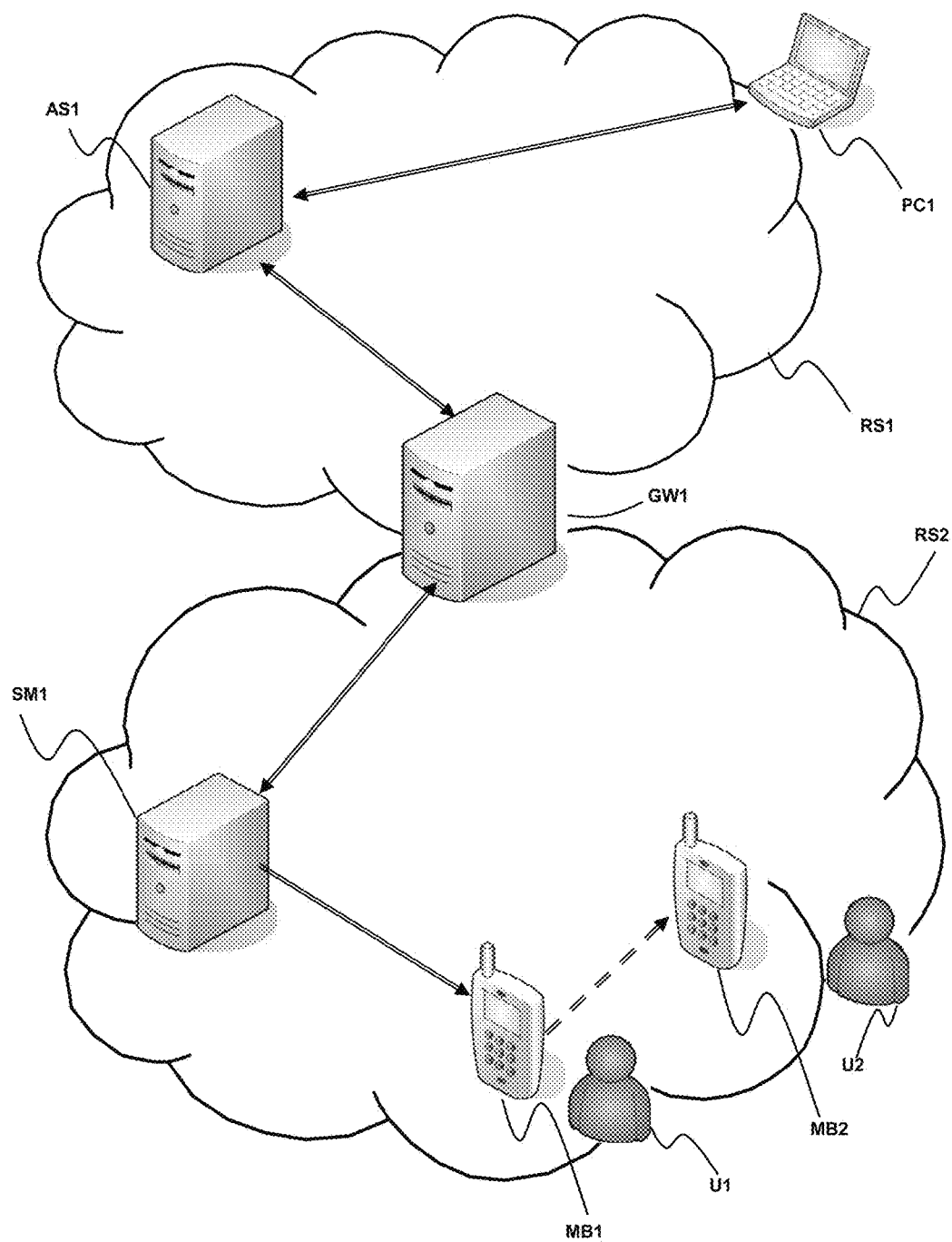
FIG. 1 is a diagram of a communications system integrating the devices of an embodiment of the invention.

The FIG. 1 system is a simplified representation of a communications system for implementing an embodiment of the invention.

This system includes:
a first network RS1, here the Internet;
a second network RS2, here a mobile network, for example a GSM, UMTS, etc. network;
an application server AS1;
a database DB;
a gateway GW;
a message server center SM1;
a first mobile terminal MB1;

a second mobile terminal MB2; and
a fixed terminal PC1.

The application server AS1 is a web server offering a service of automated call set-up between two terminals. The application server AS1 is associated with a database DB for storing a list of contacts in association with a user identifier.

In the known manner, the service offered by this server is accessible by simply setting up call between a terminal and the server via the network RS1.

When a user sets up a connection to the application server AS1 via their terminal, the latter server provides a list of contacts associated with that user for which automated call set-up is possible.

The gateway GW1 is an interconnection gateway between the network RS1 and the network RS2.

The gateway GW1 is adapted to interact with one or more application servers, notably with the application server AS1. It provides different services for these application servers, each service being activated via one or more command interfaces (Application Program Interfaces (API)) of the gateway GW1. Thus the application server AS1 includes a command module for sending command messages to the gateway GW1. In a reciprocal manner, the gateway GW1 includes a module for receiving and processing command messages sent by the application servers with which it interacts.

The message server center SM1 is a message server assigned to routing messages in the network RS2. If the network RS2 is a GSM network, this server is a message server center (SMS-C) as defined in the GSM standard. The short message service center SM1 may be controlled from the gateway GW1 by sending command messages conforming to the Short Message Peer-to-Peer (SMPP) protocol. The gateway GW1 therefore includes a command module for sending commands to the short message service center SM1. In a reciprocal manner, the short message service center SM1 includes a module for receiving and processing command messages sent by the gateway GW1 or by the servers of the network RS2 able to send it command messages.

A user U1 of the mobile terminal MB1 is able to access the application server AS1 by means of their mobile terminal MB1 connected to the network RS2. The connection between the mobile terminal MB1 and the application server AS1 is then set up via the gateway GW1.

The same user U1 is able to access the application server AS1 by means of their fixed terminal PC1 connected to the network RS1. The connection between the fixed terminal PC1 and the application server AS1 is then set up via the network RS1 without passing via the gateway GW1.

Below, U2 denotes the user of the mobile terminal MB2 with which the user U1 wishes to set up a call.

Figure 2:
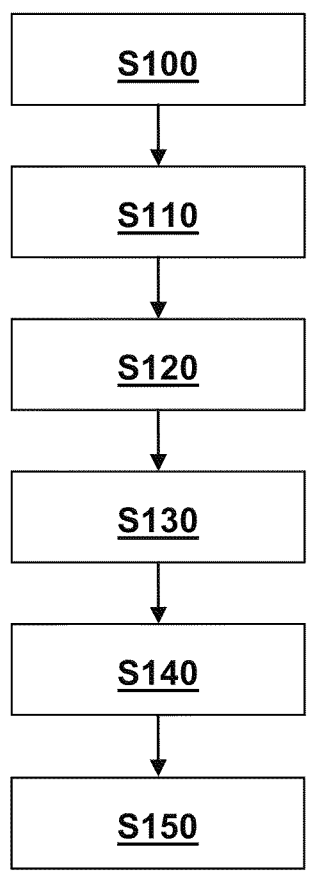
FIG. 2 is a flowchart of one implementation of the method of an embodiment of the invention.

The steps S100 to S150 of the method of an embodiment of the invention are described in more detail below with reference to FIG. 2.

Figure 3:
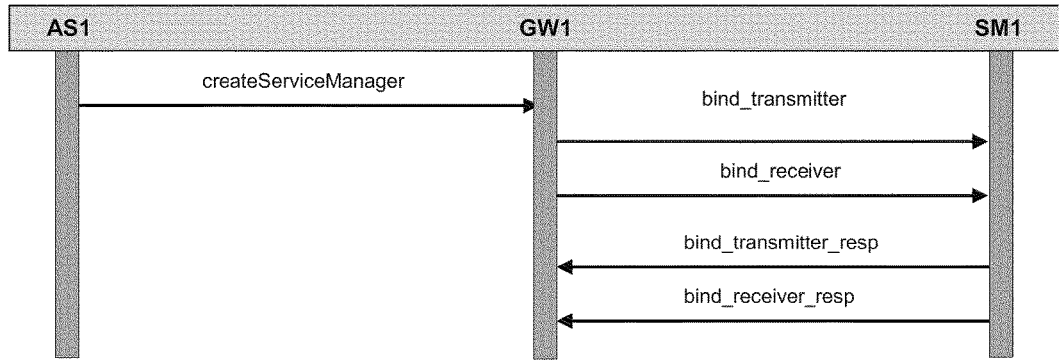
FIGS. 3 and 4 are diagrams of an exchange of data between two entities of the FIG. 1 communications system.

During an initial step S100 shown in more detail in FIG. 3 the application server AS1 is registered with the gateway GW1 so as to be recognized by that platform and to be able to send it command messages.

If the gateway GW1 has a command interface conforming to the OSA/Parlay standard enabling interaction with a user by exchanging voice, SMS, MMS, etc. messages (this is the user interaction service of the OSA/Parlay standard), this registration step entails sending a CreateServiceManager command message to the gateway GW1 in order to obtain in return a service identifier associated with the service provided by the gateway GW1 on behalf of the application server AS1.

On reception of such a command message, and using the Short Message Peer-to-Peer (SMPP) protocol, the gateway GW1 sends two command messages bind_transmitter and bind_receiver by means of which the gateway GW1 initiates dialogue with the short message service center SM1 with the aim of sending it commands to send, respectively receive, SMS (Short Message Service) messages.

The short message service center SM1 then acknowledges reception of these two command messages by sending the respective SMPP response messages bind_transmitter_resp and bind_receiver_resp.

On reception of these two response messages, the platform GW1 sends a service identifier assigned to the call between the application server AS1 and the gateway GW1.

In the step S110, the user U1 of the mobile terminal MB1 is connected to the application server AS1 in succession via the network RS1, the gateway GW1, and the network RS2. This application server AS1 offers an automated call set-up service for a mobile terminal.

To request call set-up, the user U1 must select, from a list of contacts generated by the application server AS1 and transferred to and then displayed on their mobile terminal MB1, a contact, i.e. an identifier of a user U2 they wish to call. Selecting a contact from the list of contacts causes the application server AS1 to send a web request by which the user requests call set-up with that contact.

On the basis of the name of this contact and of an identifier of the connected terminal MB1 or user U1, the application server AS1 determines both the identifier of the mobile terminal MB1 of the user U1 and also an identifier of the mobile terminal MB2 associated with the user U2 whose name has been selected, the identifiers used here being the telephone numbers of the corresponding mobile terminals.

In the step S120, the application server AS1 sends the gateway GW1 a command message.

This command message ClickToCall includes at least two parameters: the address of the mobile terminal MB1 and the address of the mobile terminal MB2. If the command message ClickToCall is sent according to the 3GPP TS 29.198-02 standard, these addresses are coded by means of a data structure TpAddress including the following information fields:

| Field name | Field type |
| --- | --- |
| Plan | TpAddressPlan |
| AddrString | TpString |
| Name | TpString |
| Presentation | TpAddressPresentation |
| Screening | TpAddressScreening |
| SubAddressString | TpString | in which:
Plan represents the dialing plan (national/international);
AddrString represents the telephone number of the terminal;
Name represents the name of the terminal;
Presentation represents the number presentation mode (masked or not);
Screening represents an authorization management code for specific numbers (toll-free numbers, etc.); and
SubAddrString represents a secondary telephone number if the terminal is accessible only via a PABX.

For more information on these information fields, refer to the above-mentioned standard.

Figure 4:
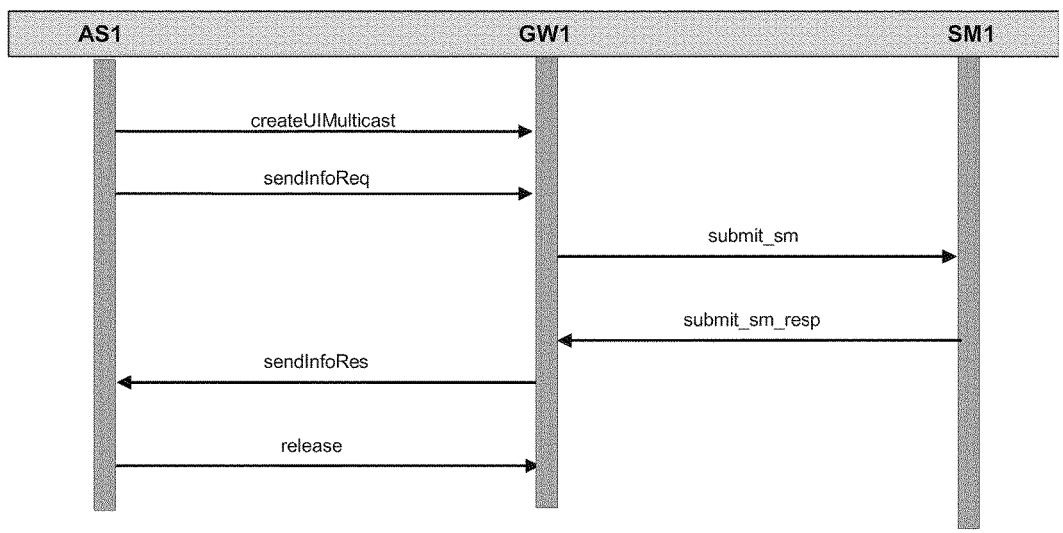

In the step S130, shown in more detail in FIG. 4, the application server AS1 sends the gateway GW1 the SMS message to be transferred to the mobile terminal MB1.

For this purpose, the application server AS1 first sends a command message to the gateway GW1 in order to initiate dialogue between the application server AS1 and the gateway GW1. This command message is the OSA/Parlay message CreateUIMulticast.

The application server AS1 then sends the gateway GW1 a OSA/Parlay command message SendInfoReq including (encapsulating) the SMS message to be sent to the mobile terminal MB1.

On reception of the command message SendInfoReq, the gateway GW1 extracts the SMS message from the command message and then sends an SMPP command message submit_sm including the SMS message to be sent to the mobile terminal MB1.

On reception of this command message, the short message service center SM1 sends the SMS message to the mobile terminal MB1 and then sends the gateway GW1 in response a message submit_sm_resp to inform it that the SMS message has been sent.

On reception of the response message submit_sm_resp the gateway GW1 sends an OSA/Parlay response message SendInfoRes to inform the application server AS1 of the result of executing the command previously sent via the message SendInfoReq.

On reception of the response message SendInfoRes, the application server AS1 sends the gateway GW1 a command message to end the dialogue between the application server AS1 and the gateway GW1. This command message is the OSA/Parlay message Release. It closes the dialogue initiated by the command message CreateUIMulticast.

In the step S140, the mobile terminal MB1 receives the SMS command message sent by the short message service center SM1.

This command message is interpreted by the mobile terminal MB1 and automatically brings about sending via the network RS2 of a request to set up a call with the destination mobile terminal MB2 specified in the SMS message.

The form of SMS command messages is specified in the ETSI standard TS 102 223 V4.10.0 (2004-09). If a message conforming to this standard is received by a mobile telephone or an equipment having equivalent communications functions, the Subscriber Identity Module (SIM) card of that equipment interprets the command message and executes the operation or operations specified by the command or commands included in the command message.

Here an embodiment of the invention aims to define a new command message for triggering a request to set up a call from the terminal receiving the command message to another terminal, having a number that is specified in the command message.

Here the command message includes a Setup a Call command. The command includes the number of the mobile terminal MB2 and the following fields:

| Information field | Value (example) |
| --- | --- |
| Principal tag of the command | D0 |
| Size of the command | 28 |
| Details of the command | 01(tag) 03 (size) 01 (set up) 10 (type) 00 (option) |

| Information field | Value (example) |
| --- | --- |
| Identity | 82 (tag) 02 (size) 83 (from network) 82 (to mobile) |
| Destination address | 06 (tag) 12 (size) 1001 (international) 0001 (ISDN) 06 76 74 47 33 (destination number) |

To be more precise, on reception of the command message, the terminal generates a call request by entering the telephone number of the destination terminal and sending a call set-up request signal in a known manner.

In the step S150, the call set-up request is notified via the network RS2 to the mobile terminal MB2, which rings. If the user U2 of the mobile terminal MB2 responds, the call is set up between the mobile terminal MB1 and the mobile terminal MB2. The call is then billed to the user U1 of the mobile terminal MB1 on the same basis as a call request entered manually by the user U1 on their mobile terminal MB1.

In contrast, if the user U2 of the mobile terminal MB2 does not respond, the call is not set up and no call is billed to either the user U1 or the user U2. The user U1 may leave a message on the voicemail of the user U2.

In a different implementation of an embodiment of the invention, the user U1 of the mobile terminal MB1 accesses the application server AS1 via a terminal different from the terminal MB1, for example a personal computer terminal PC1. Under such circumstances, the mobile terminal MB1 to which the SMS command message must be sent is identified from the identifier of the terminal PC1 or an identifier of the user U1 provided by the user on connecting to the application server AS1.

An embodiment of the invention makes it possible to offer an automated call set-up solution by sending a command to trigger automatically sending by the receiving terminal of a call set-up request. It is of particular benefit in mobile networks. It may nevertheless be transposed to calls to be set up via a fixed network using appropriate commands and protocols.

Although the present disclosure has been described with reference to one or more examples, workers skilled in the art will recognize that changes may be made in form and detail without departing from the scope of the disclosure and/or the appended claims.

The invention claimed is:

1. A "click to call" control method comprising:
providing at least one contact from a processing server to a first terminal for display to a user on the first terminal, the processing server being a web server;
after providing the at least one contact, receiving by said processing server a selection of a contact sent from the first terminal displaying the at least one contact, the selection having been made by the user from the at least one provided contact displayed on the first terminal;
sending, in a Short Message Service (SMS) command message, a command from said processing server to the first terminal, which is the same terminal that sent the selected contact to the processing server, in response to receiving by said processing server from the first terminal that sent the selected contact, the selection made by the user from the at least one contact displayed on the first terminal, said SMS command message comprising at least one of an address or an identifier of a second terminal associated with the selected contact and being configured to execute the command automatically, by the first terminal that sent the selected contact and that receives the SMS command message, wherein execution of the command triggers immediate and automatic sending directly from said first terminal that sent the selected contact, a first request to set up a call between the first terminal that sent the selected contact and the second terminal without further involvement of the processing server.

2. The control method according to claim 1, wherein the call is a voice call.

3. The control method according to claim 1, wherein said SMS command message is sent to the first terminal by a message server assigned to routing messages in a network across which said call must be set up.

4. The control method according to claim 3, wherein the step of sending is effected after reception by said processing server of a call set-up request formulated by a user of said first terminal.

5. The control method according to claim 1, wherein said request is sent by a third terminal different from the first terminal.

6. A control device comprising:
  means for receiving a command from a web server sent in response to a selection sent from a first terminal to the web server, of a contact that is provided by the web server and displayed on the first terminal and associated with a second terminal, the command comprising at least one of an address or an identifier of the second terminal; and
  means for, in response to receiving the command from the web server, sending the command in a Short Message Service (SMS) command message to the first terminal, which is the same terminal that selected the contact, wherein the SMS command message comprises the at least one of the address or the identifier of the second terminal and is configured to execute the command automatically by the first terminal that selected the contact and receives the SMS command message, wherein execution of the command triggers immediate and automatic sending directly from said first terminal that selected the contact a first request to set up a call between said first terminal that selected the contact and the second terminal without further involvement of the web server.

7. The control device according to claim 6, wherein the call is a voice call.

8. A message server for routing messages in a second network across which a call must be set up, including:
  a control device comprising:
  means for receiving a command from a web server sent in response to a selection by sent from a first terminal to the web server, of a contact that is provided by the web server and displayed on the first terminal and associated with a second terminal, the command comprising at least one of an address or an identifier of the second terminal; and
  means for, in response to receiving the command from the web server, sending the command in a Short Message Service (SMS) command message to the first terminal, which is the same terminal that selected the contact, wherein the SMS command message comprises the at least one of the address or the identifier of the second terminal and is configured to execute the command automatically by the first terminal that selected the contact and receives the SMS command message, wherein execution of the command triggers immediate and automatic sending directly from said first terminal that selected the contact a first request to set up a call between said first terminal that selected the contact and the second terminal without further involvement of the web server, wherein said means for sending are adapted to be activated on command of an interconnection device interconnecting a first network and the second network.

9. An interconnection device configured for interconnecting a first network and a second network across which a call must be set up, said interconnection device including:
  a control device comprising:
  means for receiving a command from a web server sent in response to a selection sent from a first terminal, to the web server of a contact that is provided by the web server and displayed on the first terminal and associated with a second terminal, the command comprising at least one of an address or an identifier of the second terminal; and
  means for, in response to receiving the command from the web server, sending the command in a Short Message Service (SMS) command message to the first terminal, which is the same terminal that selected the contact, wherein the SMS command message comprises the at least one of the address or the identifier of the second terminal and is configured to execute the command automatically by the first terminal that selected the contact and receives the SMS command message, wherein execution of the command triggers immediate and automatic sending directly from said first terminal that selected the contact a first request to set up the call between said first terminal that selected the contact and the second terminal without further involvement of the web server, wherein said sending means are adapted to be activated on command of said web server after reception by said web server of the selection of the contact by the user of said first terminal.

10. A user request web server including:
  means for providing at least one contact to a first terminal for display to a user on the first terminal;
  means for, after providing the at least one contact, receiving a selection of a contact sent from the first terminal displaying the at least one contact, the selection having been made by the user from the at least one contact provided by the user request web server and being associated with a second terminal; and
  means for sending, in a Short Message Service (SMS) command message, a command to the first terminal , which is the same terminal that sent the selected contact to the user request web server, in response to receiving by said user request web server from the first terminal that sent the selected contact, the selection made by the user from the at least one contact displayed on the first terminal, wherein the SMS command message comprises at least one of an address or an identifier of the second terminal associated with the selected contact and is configured to execute the command automatically, by the first terminal that sent the selected contact and that receives the SMS command message, wherein execution of the command triggers immediate and automatic sending directly from said first terminal that sent the selected contact, a first request to set up a call between said first terminal that sent the selected contact and the second terminal without further involvement of the web server.

11. A terminal comprising:
  means for accessing and displaying to a user at least one contact provided by a web server;
  means for selecting a contact from the at least one contact provided by the web server and displayed on the terminal, the contact being associated with a second terminal;
  means for receiving a Short Message Service (SMS) message including a command sent from the web server in response to the web server receiving the selection of the contact made by the user from the at least one contact displayed on the terminal, the SMS command message comprising at least one of an address or an identifier of the second terminal; and
  means for processing said SMS message, wherein said SMS command message and said means for processing are configured to execute the command automatically by the terminal, wherein execution of the command triggers immediate and automatic sending directly from said terminal that sent the selected contact a first request to set up a call with the second terminal without further involvement of the web server.

12. The terminal according to claim 11, wherein the call is a voice call.

13. A "click to call" method comprising:
  providing at least one contact from a web server to a first terminal for display to a user on the first terminal;
  after providing the at least one contact, receiving, by the web server, a selection of a contact sent from the first terminal displaying the at least one contact, the selection having been made by the user from the at least one provided contact displayed on the first terminal;
  sending, in a Short Message Service (SMS) command signal, a command from the web server to the first terminal, which is the same terminal that sent the selected contact to the processing server, in response to receiving by the web server from the first terminal that sent the selected contact, the selection made by the user from the at least one contact displayed on the first terminal, the SMS command signal comprising at least one of an address or an identifier of a second terminal associated with the selected contact;
  receiving the SMS command signal by the first terminal; and
  in response to receiving the SMS command signal, executing the command automatically by the first terminal, which triggers immediate and automatic sending directly from said first terminal, which sent the selected contact, a first request to set up a call between the first terminal that sent the selected contact and the second terminal without further involvement of the web server.

14. A non-transient storage medium readable by a data processor and storing a program including program code instructions for performing a "click to call" method when executed by the data processors, the method comprising:
  providing at least one contact from a web server to a first terminal for display to a user on the first terminal;
  after providing the at least one contact, receiving by the web server a selection of a contact sent from the first terminal displaying the first contact, the selection having been made by the user from the at least one provided contact displayed on the first terminal; and
  sending, in a Short Message Service (SMS) command message, a command from the processing server to the first terminal, which is the same terminal that sent the selected contact to the web server, in response to receiving by said web server from the first terminal that sent the selected contact, the selection made by the user from the at least one contact displayed on the first terminal, said SMS command message comprising at least one of an address or an identifier of a second terminal associated with the selected contact and being configured to execute the command automatically, by the first terminal that sent the selected contact and that receives the SMS command message, wherein execution of the command triggers immediate and automatic sending directly from said first terminal that sent the selected contact a first request to set up a call between the first terminal that sent the selected contact and the second terminal without further processing by the processing server.

* * * * *